United States Patent [19]
Williams et al.

[11] Patent Number: 5,508,853
[45] Date of Patent: Apr. 16, 1996

[54] OPTICAL FILTER

[75] Inventors: Jeffrey Williams, Greater Manchester; Anna L. Staunton, Liverpool; David W. Holden, Greater Manchester, all of United Kingdom

[73] Assignee: Pilkington PLC, Merryside, England

[21] Appl. No.: 338,607

[22] PCT Filed: May 20, 1993

[86] PCT No.: PCT/GB93/01031

§ 371 Date: Feb. 10, 1995

§ 102(e) Date: Feb. 10, 1995

[87] PCT Pub. No.: WO93/24849

PCT Pub. Date: Dec. 9, 1993

[30] Foreign Application Priority Data

May 22, 1992 [GB] United Kingdom ............... 9210952

[51] Int. Cl.⁶ .................. G02B 5/22; C08K 5/56; C08K 5/00

[52] U.S. Cl. .................. 359/885; 252/582; 359/361; 540/145

[58] Field of Search .................. 359/885, 886, 359/350, 358, 361; 252/582, 589; 540/145

[56] References Cited

U.S. PATENT DOCUMENTS 3,696,263 10/1972 Wacher .
4,885,114 12/1989 Gordon et al. .

FOREIGN PATENT DOCUMENTS 2225445 5/1990 United Kingdom .

Primary Examiner—Paul M. Dzierzynski
Assistant Examiner—Audrey Chang
Attorney, Agent, or Firm—Young & Basile

[57] ABSTRACT

An optical filter for absorption of electromagnetic radiation of wavelength $532 \times 10^{-9}$ m with excellent photostability properties is provided by a polymeric host material such as polycarbonate incorporating the absorbing compound 5, 10, 15, 20 tetrakis (4-methoxyphenyl)-21H,23H porphine palladium (II).

4 Claims, No Drawings

OPTICAL FILTER

BACKGROUND OF THE INVENTION

This invention relates to an optical filter for the absorption of electromagnetic radiation. More particularly it relates to an optical filter for the absorption of electromagnetic radiation having a wavelength in the region of $532\times10^{-9}$ m whilst allowing transmission of the remaining electromagnetic radiation.

In certain circumstances it is desirable to absorb electromagnetic radiation in a narrow wavelength band by means of an optical filter whilst allowing transmission of a substantial portion of the incident radiation, i.e. that at other wavelengths. In situations where laser radiation i.e. coherent radiation of a defined wavelength, is employed, such as certain medical and industrial applications, the beam of radiation may contact the eye or other device and cause damage thereto. In these situations absorption of electromagnetic radiation over the narrow wavelength band corresponding to the wavelength of the radiation emitted by the laser is necessary to protect the eye or optical device. Conventionally this has been achieved by way of an optical filter which whilst absorbing the narrow wavelength band corresponding to the wavelength of the laser, transmits the substantial portion of the incident radiation i.e. that at other wavelengths. Such optical filters are commonly manufactured by incorporating a compound which has particular absorption characteristics into a suitable host material, for example a polymeric matrix such as polycarbonate.

U.S. Pat. No. 4,622,174 discloses a transparent protective laser shield comprising a transparent host material and having at least one chromophore incorporated therein. The or each chromophore is selected from a porphyrin complex which has been modified by a metal, so providing metallo porphyrin complexes in the transparent material which absorb optical radiation of a pre-determined narrow wavelength band located within a selected broad wavelength band passed by the transparent host material. In particular, platinum octaethylporphyrin (PtOEP) is disclosed as being particularly suitable for absorption of neodymium YAG—doubled laser radiation at $532\times10^{-9}$ m. Although PtOEP absorbs strongly at $532\times10^{-9}$ m, its properties of photostability are very poor and unsuitable for a number of applications.

U.S. Pat. No. 4,657,345 discloses a similar shield in which the absorbers are diffused into a host material adjacent to its surface rather than being disseminated uniformly through it.

UK Patent Application No. 2225445 discloses a similar type of optical filter in which platinum deuteroporphyrin IX dimethyl ester is incorporated into the host as the absorbing material. This absorber has an absorption maxima at $533\times10^{-9}$ m.

In each of the above-mentioned documents platinum is used to form the metallo porphyrin complex in the absorbing material and consequently the absorbing material is relatively expensive.

SUMMARY OF THE INVENTION

The present invention is concerned with providing an optical filter which absorbs strongly at $532\times10^{-9}$ m.

Furthermore the present invention aims to provide an optical filter which is relatively inexpensive to manufacture.

According to an aspect of the present invention there is provided an optical filter for the absorption of electromagnetic radiation in a narrow wavelength band, the filter comprising a transparent host material, and an electromagnetic radiation absorbing material comprising the compound 5,10,15,20 tetrakis (4-methoxyphenyl)-21H,23H porphine palladium (II).

DESCRIPTION OF THE PREFERRED EMBODIMENTS

In a preferred embodiment of the invention the transparent host material comprises a polymeric matrix, preferably polycarbonate.

As the cost of palladium is almost a quarter that of platinum, optical filters according to the present invention are considerably less expensive than those which incorporate platinum.

An embodiment of the invention will now be described.

The compound 5,10,15,20 tetrakis (4-methoxyphenyl)-21H,23H porphine palladium (II) [TTL], was synthesized in the manner described in the Journal of American Chemical Society, Vol 81, 1959 pages 5111 to 5119, the disclosures of which are incorporated herein by way of reference.

The TTL compound is mixed as a dry powder with polycarbonate granules and moulded directly at normal moulding temperatures. For example 200 mg of TTL was mixed as a dry powder with 500 g of polycarbonate granules (Makroion 2400, supplied by Bayer) and moulded into 1.8 mm thick plano lenses at 280° C. The resulting lenses have an optical density of 3.0 at $532\times10^{-9}$ m. This optical filter absorbs strongly at $532\times10^{-9}$ m. The optical filter has excellent photostability properties, and consequently does not require the addition of additives such as antioxidants or ultra violet absorbers, although this may be done if preferred.

In order to show the excellent photostability properties of an optical filter according to the present invention, during testing of the material it has been found that in an accelerated photofatigue test, TTL shows only a 5.7% loss of absorbance (in polycarbonate) after 800 hours.

By comparison the photostability of PtOEP is very inferior when compared to TTL. Normally the PtOEP is injection moulded into the polycarbonate host and in an accelerated photofatigue test it was found that a polycarbonate optical filter incorporating PtOEP showed a 22% loss of absorbance after only 18 hours. This loss of absorbance increases to 34% after 66 hours, and 70% after 350 hours.

Other absorbing materials for absorbing other narrow wavelength bands can be incorporated into the host material together with the TTL material to provide protection against multiple narrow wavelength bands, for example, vanadyl phthalocyanine (VOPc) is suitable for the absorption of ruby laser wavelength of around $694\times10^{-9}$ m. For example 35 mg of VOPc was mixed as a dry powder with 500 g of polycarbonate (Makroion 2400 supplied by Bayer) and moulded into 1.8 mm thick plano lenses at 280° C. The resulting lenses have an optical density of 2.0 at $694\times10^{-9}$ m Tris(p-diethylaminophenyl)-aminium hexafluoroantimonate (Tdaha) is suitable for the absorption of neodium laser wavelength of around $1064\times10^{-9}$ m. 338 mg of Tdaha is mixed as a dry powder with 500 g of polycarbonate (Makroion 2400 supplied by Bayer) and moulded into 1.8 mm thick plano lenses at 280° C. The resulting lenses have an optical density of 2.0 at $1064\times10^{-9}$ m.

It should be noted that TTL can be incorporated into polymeric matrix hosts other than polycarbonate, for example polyurethane.

We claim:

1. An optical filter for the absorption of electromagnetic radiation in a narrow wavelength band, the filter comprising a transparent host material, and an electromagnetic radiation absorbing material-comprising the compound 5,10,15,20 tetrakis (4 methoxyphenyl)-21H,23H porphine palladium (II).

2. An optical filter as claimed in claim 1 wherein said host material comprises polymeric matrix.

3. An optical filter as claimed in claim 2 wherein said polymeric matrix comprises polycarbonate.

4. An optical filter as claimed in any preceding claim wherein the filter comprises at least one further electromagnetic radiation absorbing material for absorbing a narrow wavelength band of radiation.

* * * * *